Feb. 1, 1955 H. PLETSCHER 2,701,276

TWINPLEX TELEGRAPH SIGNAL RECEIVER

Filed June 6, 1952 3 Sheets-Sheet 1

INVENTOR

H. PLETSCHER

BY Robert Harding Jr.

ATTORNEY

INVENTOR
H. PLETSCHER
BY Robert Harding Jr.
ATTORNEY

Feb. 1, 1955 H. PLETSCHER 2,701,276

TWINPLEX TELEGRAPH SIGNAL RECEIVER

Filed June 6, 1952 3 Sheets-Sheet 3

INVENTOR

H. PLETSCHER

BY Robert Harding Jr.

ATTORNEY

United States Patent Office 2,701,276

Patented Feb. 1, 1955

2,701,276

TWINPLEX TELEGRAPH SIGNAL RECEIVER

Hermann Pletscher, Pforzheim, Germany, assignor to International Standard Electric Corporation, New York, N. Y., a corporation of Delaware Application June 6, 1952, Serial No. 292,059

Claims priority, application Germany June 7, 1951

6 Claims. (Cl. 178—61)

The twinplex method is a modification of the telegraphic methods that employ the so-called keying-over to emit the marking and spacing signals, and its use makes it possible for two telegrams to be transmitted at the same time over one transmission path.

While the operation of frequency keying-over consists in alternately keying, two frequencies positioned symmetrically of the nominal transmitter frequency, one frequency corresponding to the marking signal and the other to the spacing signal, the twinplex method, in its turn, emits one or another of four frequencies at a time along both channels and in such a manner that each frequency serves a certain definite function in respect of either marking or spacing. These frequencies may be allotted to the two channels A, B as follows:

| Channel A | Channel B | Frequencies |
|---|---|---|
| Marking Signal | Marking Signal | $f1$ |
| Marking Signal | Spacing Signal | $f2$ |
| Spacing Signal | Marking Signal | $f3$ |
| Spacing Signal | Spacing Signal | $f4$ |

The frequency allocation may be accomplished as illustrated in Fig. 1, in which the reference character "Z" represents "marking signal," while the reference character "Tr" represents "spacing signal." The total frequency swing or stroke is, say, 1200 C./S. The frequencies $f2$, $f3$, each differ from the mean frequency $fe$ by 200 C./S., while the frequencies $f1$, $f4$ are each different from $fe$ by 600 C./S. The frequency distances between $f1$ and $f2$, $f2$ and $f3$, $f3$ and $f4$ thus amount to 400 C./S.

The twinplex receiving method as practised hitherto is as follows: The frequencies $f1$, $f2$, $f3$, $f4$ are conveyed to a two-channel converter that comprises an amplitude limiter, filters to separate the frequencies from each other, and signal rectifiers. These rectifiers lead to a direct-current amplifier which can at will be connected either to the output circuit for channel A or to that for channel B. A receiving arrangement so constructed has various drawbacks, viz:

1. The faulty impulses in channel B, to which the method gives rise when changing from one frequency to the other, are increased by the building-up time or transient period.

2. If the limiter is not controlled to perfection the filters permit the interference spectrum of their bandwidth to affect the signal rectifiers.

3. The arrangement uses a comparatively large amount of equipment, and the voice frequency filters which it employs cause the testing period to be relatively long.

The circuit arrangement which is the subject of the invention and serves to receive telegraph signals by employing, in particular, the twinplex method, is characterized in this, that the several frequencies received are conveyed to a linear converter. According to a further improvement the different circuit conditions allotted to the several channels are selected by an arrangement of electron tubes.

The invention thus completely avoids the use of voice frequency filters.

One embodiment of the invention is represented in the accompanying drawing, in which.

Figure 1:
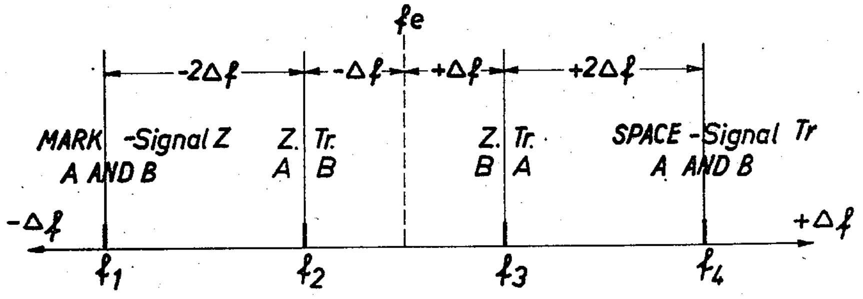
Fig. 1 is a frequency arrangement that relates to the foregoing allocation table.

If the marking and the spacing-signal frequencies are allotted to the channels A, B in the manner herebefore explained, then it can be seen from Fig. 1 that the frequencies $f1$, $f2$, allotted to channel A in respect of the marking signal, are lower than the receiving frequency $fe$, and that the frequencies $f3$, $f4$, allotted to it in respect of the spacing signal, are higher than $fe$. Channel A can hence be received just as in the case of frequency keying-over operation, the only difference being that for the twinplex method the marking and the spacing frequencies are not in any case symmetrical with respect to $fe$.

The frequencies $f1$, $f3$, however, allotted to channel B in respect of the marking signal, are respectively lower and higher than $fe$. Equally, as regards channel B, the frequencies $f2$, $f4$, for the spacing signal, are such that $f2$ is lower than $fe$ while $f4$ is higher than $fe$.

The invention provides for selecting the signals intended to belong to channel A and those which are to belong to channel B. To such end the frequencies are conveyed to a linear converter stage.

Figure 2:
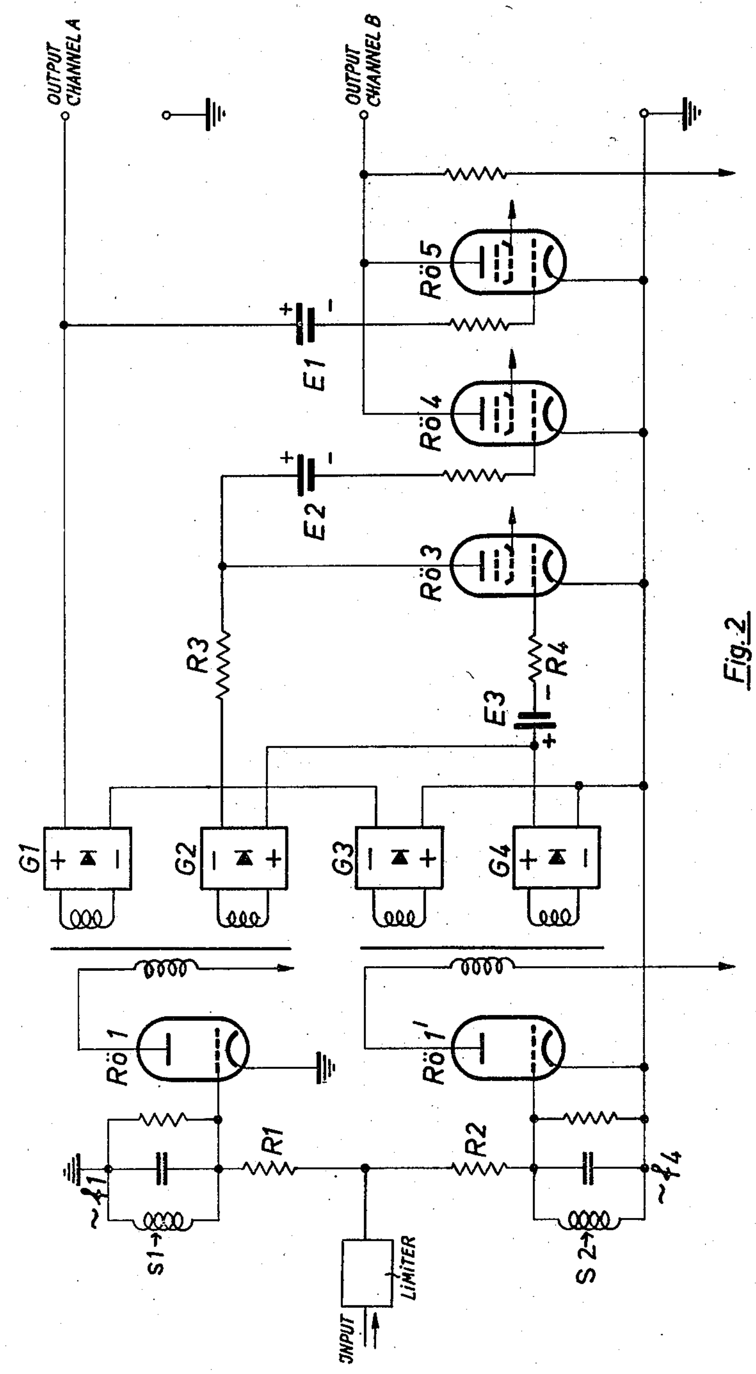
Fig. 2 represents the receiving circuitry.

An arrangement suitable in this regard is shown in Fig. 2. The four frequencies $f1$, $f2$, $f3$, $f4$ are supplied, after demodulation of the carrier, to a limiter stage and thence to the converter represented in Fig. 2. The converter, as here shown by way of example, comprises two oscillatory circuits S1, S2 whose resonant frequencies respectively are $f1$, $f4$. The circuits S1, S2 are connected to the output path of the amplitude limiter through resistors R1 and R2. The circuit S1 controls an amplifier Ro1 allotted to it, while the circuit S2 controls an amplifier Ro1'. The two amplifiers Ro1 and Ro1' have each a transformer associated with rectifiers. The rectifiers G1, G2, G3, G4 so provided are in pairs interconnected in opposition to each other and are so poled that the differential voltage from G1, G3 results in the linear converted characteristic 1, Fig. 3, and that the differential voltage from G2, G4 results in the linear converter characteristic 2, Fig. 3. In this way the direct voltages from G1, G3, produced by the frequencies $f1$, $f2$, will be positive while those produced by $f3$, $f4$ will be negative, so that for channel A, marking and spacing signals can be obtained in the form of positive and of negative direct-current impulses, directly from the rectifiers G1, G3.

Figure 3:
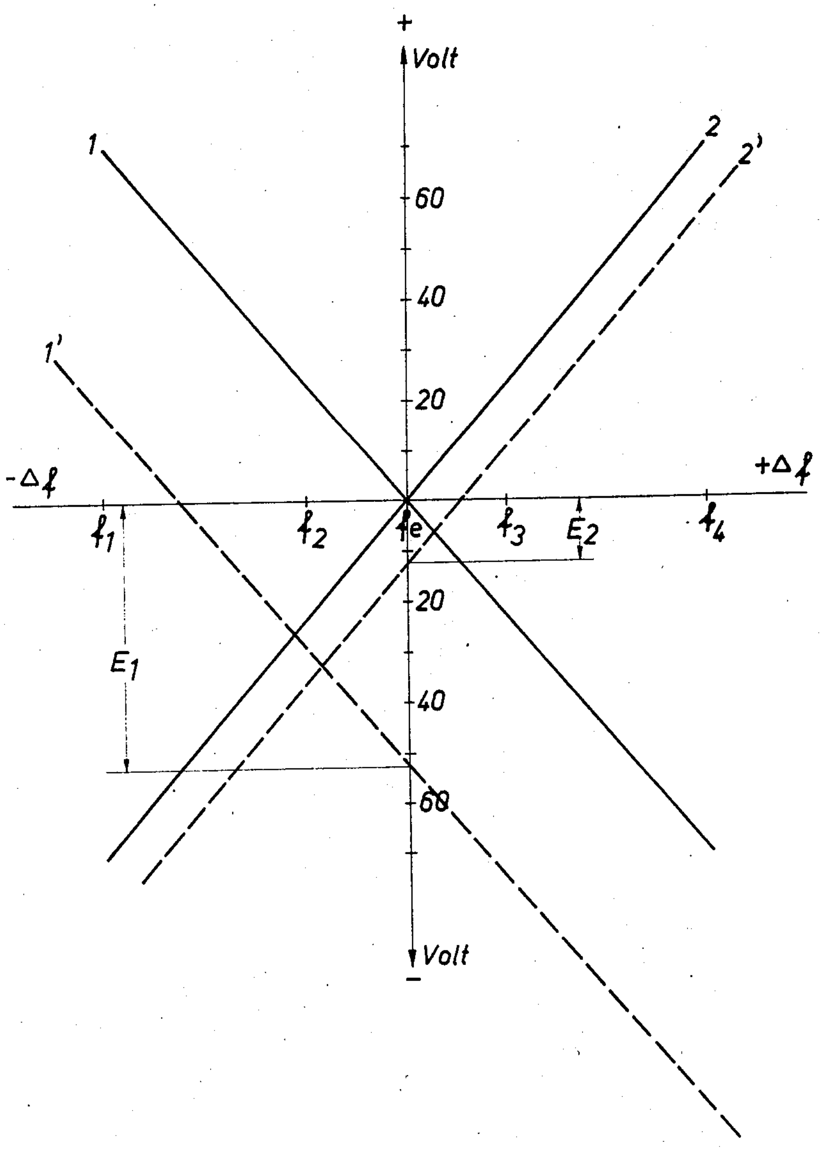
Fig. 3 shows the converter characteristics.

In order to generate the signals for channel B, the second pair of rectifiers G2, G4 is arranged in addition to G1, G3. The direct voltages produced by the frequencies $f3$, $f4$ are positive at the rectifiers G2, G4 while those produced by $f1$, $f2$ are negative, as illustrated by converter characteristic 2, Fig. 3. The selection as to the circuit conditions allotted to the channels, in particular to channel B, is made by an arrangement of electron tubes. The pair of rectifiers G1, G3, controls the keying tube Ro5 while by the pair of rectifiers G2, G4 the keying tube Ro4 is controlled. The tubes Ro5, Ro4 furnish directly direct-current impulses to channel B. If, for instance, the circuit conditions for the marking signal are to be utilized to bring about the control action, the converter voltages generated by the frequencies $f1$, $f3$ must be rendered effective. Therefore, only frequency $f1$ is to cause anode current to flow in tube Ro5. To such end the grid bias source E1 is arranged to displace the converter characteristic 1, Fig. 3, into position 1'. It can thus be seen that only frequency $f1$ will be able to overcome the grid bias of Ro5 and thereby to actuate this tube. Tube Ro4 in its turn is to carry anode current when influenced by no frequency other than $f3$. To prevent tube Ro4 from becoming opened by frequency $f4$, tube Ro3 is connected in parallel with the rectifiers G2, G4 over drop resistance R3 and the control grid of Ro4 is biased by voltage source E2, with the result that the converter characteristic 2, Fig. 3, is displaced into position 2'. The grid of tube Ro3 is controlled by the voltage from rectifier G4. The bias source E3 for Ro3 is so dimensioned that the grid voltage shall be positive when the direct voltage produced by frequency *f*3 is exceeded by a certain amount such as bias E3. If anode current flows in tube Ro3, resistance R3 acts to reduce the voltage from the rectifiers G2, G4 practically to zero, so that only the negative potential of E2 will to some extent be effective at the grid of Ro4. No anode current can hence flow in Ro4. Frequency *f*4 thus does not open the tube Ro4 and accordingly does not initiate a keying impulse. When frequency *f*3 produces a direct voltage from the rectifiers G2, G4, this voltage is not sufficient to overcome the bias E3 and tube Ro3 will not conduct. The voltage from the rectifiers G2, G4 is then sufficient to overcome the bias of E2 and tube Ro4 will conduct and a keying impulse is initiated. The anodes of Ro4, Ro5 are interconnected. The anode circuit thus common to them is the output circuit for channel B.

Figure 4:
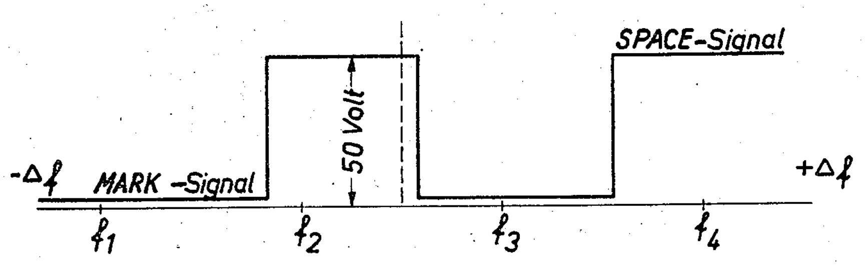
Fig. 4 illustrates the anode voltage curve of the tubes employed for selection.

In Fig. 4 the potential on the anodes of Ro4, Ro5 is plotted in respect of the frequencies. It will be seen that decrease of the anode voltage occurs only under the influence of the frequencies *f*1, *f*3 and that accordingly only in this case marking signals are delivered to channel B. The frequencies *f*2, *f*4 do not influence the keying tubes and thus give rise to the desired spacing signals. Furthermore, the aforesaid displacement of the characteristic 1, 2, Fig 3, may be made to be such as to reduce considerably the faulty impulses arising in channel B by one frequency changing into the other. This is not possible where filters are employed.

It is to be understood that the selecting arrangement represented in Fig. 2 is merely shown by way of example and that other selecting arrangements, or modifications of that here described, may be employed. For instance, the arrangement may be such as to provide for selecting among six or still more frequencies, which on the receiving side are brought to produce more than two circuit conditions. The invention is applicable wherever multichannel systems are operated by frequency keying-over.

What is claimed is:

1. A twinplex telegraph signal receiver comprising a linear frequency converter having a single input and first and second outputs, means for applying signal frequencies to said input at constant amplitude, first means in said converter connected to said first output for applying a direct current potential to said first output proportional to the frequency applied to said input circuit, means for applying a direct current potential to said second output when the direct current potential applied to said first output exceeds a predetermined value, second means in said converter connected to said second output for applying a direct current potential to said second output when frequencies exceeding a predetermined frequency are applied to said input circuit, and means connected to said second potential applying means and controlled thereby for preventing the application of said direct current potential to said second output when the applied frequency exceeds a predetermined greater frequency than said first predetermined frequency.

2. A twinplex telegraph signal receiver, according to claim 1, in which the converter comprises first and second tuned circuits connected to the input and tuned respectively to the lowest and the highest of the signal frequencies, an amplifier connected to each tuned circuit, first and second transformers, the primary windings of said transformers being respectively connected to the outputs of said amplifiers, first and second secondary windings on each transformer, said first windings being connected in series with the first output of said converter, said second windings being connected in series with the second output of said converter, the first potential applying means forming part of the series circuit of said first windings and comprising rectifiers so poled as to produce a direct current potential of one polarity on said first output when current flows in the first winding of said first transformer and a direct current potential of the opposite polarity when current flows in the first winding of said second transformer, the second potential applying means forming part of the series circuit of said second windings and comprising rectifiers so poled as to produce a direct current potential of one polarity on the second converter output when current flows through said second winding of said first transformer and a direct current potential of the opposite polarity when current flows through said second winding of said second transformer.

3. A twinplex telegraph signal receiver, according to claim 2, in which the means for applying a direct current potential to the second output of the converter when the potential applied to the first output exceeds a predetermined value comprises a first electron tube with its input circuit connected to said first output, and its output circuit connected to said second output, and means for biasing said input circuit sufficiently to prevent said tube from operating when the direct current potential is below said predetermined value.

4. A twinplex telegraph signal receiver, according to claim 3, in which the second potential applying means includes a second electron tube with its output connected to the second output of the converter, and means for biasing the input of said tube to prevent its operation except when potentials exceeding a predetermined value are applied thereto.

5. A twinplex telegraph signal receiver, according to claim 4, in which the means for preventing the application of the direct current potential to the second output of the converter comprises a third electron tube connected across the input circuit of the second tube, and means for biasing the input circuit of said third tube so as to prevent the operation of said third tube unless the potential applied to the input circuit thereof exceeds a predetermined value.

6. A twinplex telegraph signal receiver, according to claim 1, in which the means for applying a direct current potential to the second output of the converter when the potential applied to the first output exceeds a predetermined value comprises a first electron tube with its input circuit connected to said first output and its output circuit connected to said second output, and means for biasing said input circuit sufficiently to prevent said tube from operating when the direct current potential is below said predetermined value, and in which the second potential applying means includes a second electron tube with its output connected to the second output of the converter, and means for biasing the input of said tube to prevent its operation except when potentials exceeding a predetermined value are applied thereto, and in which the means for preventing the application of the direct current potential to the second output of the converter comprises a third electron tube connected across the input circuit of the second tube, and means for biasing the input circuit of said third tube so as to prevent the operation of said third tube unless the potential applied to the input circuit thereof exceeds a predetermined value.

References Cited in the file of this patent

UNITED STATES PATENTS

| | | |
|---|---|---|
| 2,464,837 | Werthmann et al. | Mar. 22, 1949 |
| 2,543,050 | Oberman | Feb. 27, 1950 |
| 2,650,266 | Browning | Aug. 25, 1953 |